United States Patent [19]

Terada et al.

[11] Patent Number: 4,732,924
[45] Date of Patent: Mar. 22, 1988

[54] METHOD FOR PRODUCING VINYL AROMATIC RESIN COMPOSITION

[75] Inventors: Eiichi Terada, Kimitsu; Hiroshi Kurokawa; Shigemi Kawazoe, both of Ichihara, all of Japan

[73] Assignee: Idemitsu Petrochemical Company Limited, Tokyo, Japan

[21] Appl. No.: 881,118

[22] Filed: Jul. 1, 1986

[30] Foreign Application Priority Data

Jul. 17, 1985 [JP] Japan .................. 60-157838
Jul. 17, 1985 [JP] Japan .................. 60-157839

[51] Int. Cl.$^4$ ............... C08F 279/02; C08L 51/04
[52] U.S. Cl. ................... 524/269; 525/53; 525/64; 525/83; 525/105; 525/285
[58] Field of Search ............ 525/53, 64, 105, 285; 524/269

[56] References Cited

U.S. PATENT DOCUMENTS 4,336,354  6/1982  Lordi et al. .................. 525/285

FOREIGN PATENT DOCUMENTS 2827594 10/1979 Fed. Rep. of Germany ........ 525/64
0035355  9/1974 Japan .................. 525/53
0031914  2/1982 Japan .................. 525/285

*Primary Examiner*—Wilbert J. Briggs, Sr.
*Attorney, Agent, or Firm*—Browdy and Neimark

[57] ABSTRACT

Disclosed is a method for producing a vinyl aromatic resin composition containing a rubber in a disposed state which comprises from 60 to 90% by weight of a copolymer of a vinyl aromatic monomer with an unsaturated dicarboxylic anhydride in which the content of the vinyl aromatic monomer as a monomer unit is from 70 to 98 mol % and the content of the unsaturated dicarboxylic anhydride as a monomer unit is from 2 to 30 mol %, from 10 to 35% by weight of a graft copolymer and from 0 to 9% by weight of a diene based rubber, by copolymerizing the vinyl aromatic monomer with the unsaturated dicarboxylic anhydride in the presence of the diene based rubber, wherein said method comprises.

(1) mixing (i) from 2 to 25% by weight of a graft copolymer consisting of (a) from 50 to 85% by weight of a polymer main chain containing a butadiene monomer unit in an amount of 50% by weight or more, (b) from 40 to 5% by weight of a polymethacrylate side chain attached by graft-polymerization to the polymer main chain (a), and (c) from 0 to 40% by weight of a polystyrene side chain attached by graft-polymerization to the polymer main chain (a), or from 2 to 25% by weight in total of the graft copolymer and a diene based rubber, with (ii) from 98 to 75% by weight of a vinyl aromatic monomer, (2) adding (iii) an unsaturated dicarboxylic anhydride to the resulting mixture, and (3) continuing copolymerization reaction of the mixture until the conversion of the vinyl aromatic monomer reaches a value within the range of from 30 to 80% by weight. The resin composition produced by this method can be molded into a molded article having an excellent glossiness, impact strength and heat resistance.

7 Claims, 1 Drawing Figure

METHOD FOR PRODUCING VINYL AROMATIC RESIN COMPOSITION

FIELD OF THE INVENTION

The present invention relates to a method for producing a vinyl aromatic resin composition. More particularly, it relates to a method for producing a vinyl aromatic resin composition having an excellent glossiness, impact strength and heat resistance.

BACKGROUND OF THE INVENTION

Styrene-maleic anhydride copolymers (hereinafter sometimes referred to as "SMA" for brevity) have heretofore been used widely as industrial materials in various fields since they have an excellent heat resistance, and according as their use or application is expanded it is increasingly desired to further improve their glossiness and impact strength.

Japanese Patent Publication No. 7849/80 discloses a method for producing an SMA based resin composition by copolymerizing styrene having dissolved therein a butadiene rubber with maleic anhydride to form a copolymer matrix and dispersing in the copolymer matrix a rubber particle which absorbs a part of the copolymer. However, this method is disadvantageous since it cannot give rise to resin compositions which are excellent in both glossiness and impact strength.

On the other hand, Japanese Patent Publication No. 13541/84 discloses a resin composition comprising a blend of a methacrylate-butadiene-styrene copolymer (hereinafter sometimes referred to as "MBS" for brevity) prepared by an emulsion polymerization method with an SMA. This resin composition, however, has an insufficient impact strength.

SUMMARY OF THE INVENTION

An object of the present invention is to solve the above-described problems and provide a method for producing a resin composition which can be molded into a molded article having a glossiness, impact strength and heat resistance that are satisfactory for practical purposes.

In order to achieve the above-described object according to the present invention, a graft copolymer having a specific construction, or a graft copolymer having a specific construction and a diene based rubber, is or are mixed with a vinyl aromatic monomer in a specific ratio to form a mixture, and the mixture is mixed with an unsaturated dicarboxylic anhydride, followed by polymerizing the resulting mixture to such an extent that the conversion of the vinyl aromatic monomer reaches a predetermined value.

BRIEF DESCRIPTION OF THE DRAWING

Single FIGURE is a flow sheet illustrating a two-stage continuous process as an embodiment for practicing the method of the present invention.

DETAILED DESCRIPTION OF THE INVENTION

Figure 1:
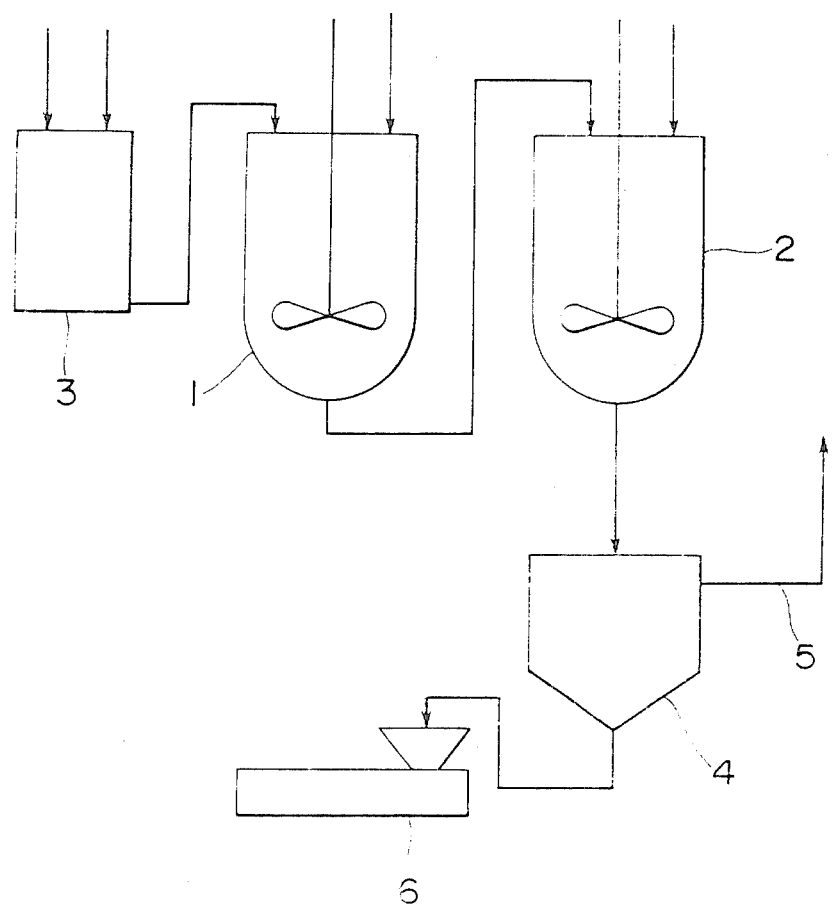

The method according to the present invention is a method for producing a vinyl aromatic resin composition containing a rubber in a dispersed state, by copolymerizing a vinyl aromatic monomer with an unsaturated dicarboxylic anhydride in the presence of a rubber, wherein said method comprises mixing (i) from 2 to 25% by weight of a graft copolymer consisting of (a) from 50 to 85% by weight of a polymer main chain containing a butadiene monomer unit in an amount of 50% by weight or more, (b) from 40 to 5% by weight of a polymethacrylate side chain attached by graft-polymerization to the polymer main chain (a), and (c) from 0 to 40% by weight of a polystyrene side chain attached by graft-polymerization to the polymer main chain (a), or from 2 to 25% by weight in total of the graft copolymer and a diene based rubber, with (ii) from 98 to 75% by weight of a vinyl aromatic monomer, adding (iii) an unsaturated dicarboxylic anhydride to the resulting mixture, and continuing copolymerization reaction of the mixture until the conversion of the vinyl aromatic monomer reaches a value within the range of from 30 to 80% by weight.

The graft copolymer used is composed of a polymer main chain (a) containing a butadiene monomer unit in an amount of 50% by weight or more to which a polymethacrylate side chain (b) and a polystyrene side chain (c) are attached in specific amounts.

The polymer main chain (a) contains a butadiene monomer unit in an amount of 50% by weight or more. Therefore, as an example of the graft copolymer which can be used in the present invention, there can be enumerated a graft copolymer which contains a polymer main chain containing a butadiene monomer unit in an amount of 100% by weight, and a graft copolymer which contains a polymer main chain containing a butadiene monomer unit in an amount of 50% by weight or more and an other vinyl monomer unit in an amount of less than 50% by weight.

When the content of the butadiene monomer unit in the polymer main chain in the graft copolymer is less than 50% by weight, molded articles molded from the vinyl aromatic resin composition have a decreased impact strength.

Suitable examples of the vinyl monomer include styrene and methacrylates.

As for the methacrylate which can be used as a monomer unit for constituting the polymethacrylate side chain (b) in the graft copolymer, there can be illustrated, for example, methyl methacrylate, ethyl methacrylate, etc.

There is no limitation on styrene which is used as a monomer unit for constituting the polystyrene side chain (c) in the graft copolymer.

In the present invention, it is desirable that the graft copolymer is composed of from 50 to 85% by weight, preferably from 65 to 80% by weight, of the polymer main chain (a) containing a butadiene monomer unit in an amount of 50% by weight or more, preferably 70% by weight or more, from 40 to 5% by weight, preferably from 20 to 10% by weight, of the polymethyl methacrylate side chain (b) attached by graft-polymerization to the polymer main chain (a), and from 0 to 40% by weight, preferably from 0 to 20% by weight, of the polystyrene side chain (c) attached by graft-polymerization to the polymer main chain (a).

When the content of the polymer main chain (a) is less than 50% by weight and the content of the polymethacrylate side chain (c) exceeds 40% by weight or the content of the polystyrene side chain (c) exceeds 40% by weight, the graft copolymer exhibits predominantly the properties of polymethacrylate or polystyrene, thus failing to achieve the object of the present invention.

On the contrary, when the content of the polymer main chain (a) exceeds 85% by weight and the content of the polymethacrylate side chain (b) is less than 5% by weight, the graft copolymer exhibits predominantly the properties of polybutadiene, resulting in that the object of the present invention cannot be attained.

The graft copolymer which is used in the present invention can be obtained by emulsion polymerizing butadiene in a conventional manner optionally in the presence of a crosslinking agent such as ethylene dimethacrylate or divinylbenzene, etc. to form a polymer latex, adding a methacrylate and styrene to the polymer latex, and emulsion copolymerizing the resulting mixture.

The graft copolymer can be prepared by a one-stage method in which the above-described polymer latex is blended with a methacrylate and styrene simultaneously, followed by graft copolymerization, or by a two- or multi-stage method in which the above-described polymer latex is blended with one member selected from a methacrylate monomer and a styrene monomer, followed by graft copolymerization to form a graft copolymer of the polymer latex with the methacrylate or styrene, and then the remaining member of the methacrylate and styrene monomers is further graft-polymerized to grow the resulting graft copolymer. As for the graft copolymer, an MBS resin, e.g., "METABLEN C-223" (trade name for a product by Mitsubishi Rayon Co., Ltd.) is preferred.

Suitable examples of the diene based rubber include butadiene rubber, isoprene rubber, chloroprene rubber, styrene-butadiene rubber, butadiene-acrylonitrile rubber, styrene-butadiene-styrene rubber, etc. These rubbers can be used singly or one or more rubbers can be used in admixture. Of these rubbers, butadiene rubber, styrene-butadiene rubber and styrene-butadiene-styrene rubber are preferred.

One of the features of the present invention is in the use of a graft copolymer having a specific construction or of such a graft copolymer and a diene based rubber in combination.

Suitable examples of the vinyl aromatic monomer include styrene, α-methylstyrene, dimethylstyrene, diethylstyrene, vinyltoluene, isopropenylbenzene, monochlorostyrene, dichlorostyrene, vinylxylene, ethylvinylxylene, etc. Of these, styrene, α-methylstyrene and vinyltoluene are preferred.

Suitable examples of the unsaturated dicarboxylic anhydride include maleic anhydride, itaconic anhydride, hydroxymaleic anhydride, citraconic anhydride, phenylmaleic anhydride, aconitic anhydride, ethylmaleic anhydride, chloromaleic anhydride, etc. Of these, maleic anhydride is preferred.

In the method of the present invention, the graft copolymer, or the graft copolymer plus the diene based rubber, the vinyl aromatic monomer and the unsaturated dicarboxylic anhydride are blended in specific ratios and copolymerized until the conversion of the vinyl aromatic monomer reaches a predetermined value within the range of from 30 to 80% by weight.

When the graft copolymer alone is used, from 25 to 2% by weight, preferably from 15 to 5% by weight, of the graft copolymer is mixed with from 75 to 98% by weight, preferably from 80 to 95% by weight, of the vinyl aromatic monomer.

On the other hand, when the graft copolymer and the diene based rubber are used in combination, the graft copolymer and the diene based rubber in a total amount of from 25 to 2% by weight, preferably from 15 to 4.5% by weight, of the graft copolymer plus from 5 to 0.5% by weight of the diene based rubber, are mixed with from 75 to 98% by weight, preferably from 80 to 95% by weight, of the vinyl aromatic monomer.

Then, an unsaturated dicarboxylic anhydride is further added to this mixture, and polymerization reaction is continued until the conversion of the vinyl aromatic monomer reaches a predetermined value within the range of from 30 to 80% by weight. Then, the polymerization reaction is stopped and unused monomers are removed.

If the amount of the graft copolymer blended exceeds 25% by weight when the diene based rubber is absent or if the total amount of the graft copolymer plus the diene based rubber exceeds 25% by weight, vinyl aromatic resin compositions having a satisfactory heat resistance cannot be obtained even when the polymerization reaction is carried out under the same conditions as those used in the method of the present invention. On the other hand, if the amount of the graft copolymer blended is below 2% by weight when the diene based rubber is not used together or if the total amount of the graft copolymer plus the diene based rubber blended is below 2% by weight, vinyl aromatic resin compositions which can be molded into articles having a satisfactory impact strength are not obtained.

It is undesirable to stop the polymerization reaction before the conversion of the vinyl aromatic monomer reaches 30% by weight from the viewpoint of productivity, and it is also undesirable to continue the polymerization reaction after the conversion of the vinyl aromatic monomer has reached a value well above 80% by weight since the reaction system becomes highly viscous and the polymerization reaction does not proceed uniformly, resulting in that the vinyl aromatic resin composition finally obtained exhibits deteriorated physical properties.

The mixing and polymerization reaction can be carried out in a single polymerization reactor or by a multi-stage continuous process using a plurality of polymerization reactors arranged in series. Industrially, it is preferred to use a two- or three-stage continuous process. As for the polymerization reactor any conventional polymerization reactor can be used. Particularly, those reactors which are of a complete mixing type, more particularly those provided with double helical blades or Crofford-Russel blades, are employed advantageously.

Preferred process is as follows. In the case where such a multi-stage continuous process, particularly a two-stage continuous process, as described above is employed, when the diene based rubber is not used, at first from 25 to 2% by weight of the graft copolymer and from 75 to 98% by weight of the vinyl aromatic monomer are charged in a first polymerization reactor in the first stage and the mixture is stirred for mixing. On the other hand, when the diene based rubber is used, from 25 to 2% by weight in total of the graft copolymer and the diene based rubber and from 75 to 98% by weight of the vinyl aromatic monomer are charged in a first polymerization reactor in the first stage and the resulting mixture is stirred for mixing.

Then, regardless of whether or not the diene based rubber is used in combination, the unsaturated dicarboxylic anhydride is added to the first polymerization reactor, followed by polymerization reaction until the conversion of the vinyl aromatic monomer added reaches a value within the range of from 15 to 40% by weight. Thereafter, the whole product of the polymerization reaction in the first polymerization reactor is transferred to a second polymerization reactor in the second stage, and the unsaturated dicarboxylic anhydride is further added to the second polymerization reactor, followed by polymerization reaction which is continued until the conversion of the vinyl aromatic monomer added reaches a value within the range of from 40 to 80% by weight.

In this two-stage continuous process, the polymerization reaction can be carried out by a bulk polymerization method or a solution polymerization method. However, the bulk polymerization method is preferred since it does not need recovery and separation of the solvent used.

The polymerization reaction can proceed usually at a temperature of from 50° to 200° C., preferably from 60° to 180° C.

In the initiation of the polymerization reaction, a polymerization initiator can be added to the reaction system. Suitable examples of the polymerization initiator include benzoyl peroxide, 2,4-dichlorobenzoyl peroxide, di-t-butyl peroxide, t-butyl peroxybenzoate, dicumyl peroxide, cumene hydroperoxide, diisopropylbenzene hydroperoxide, diisopropyl peroxydicarbonate, t-butyl peroxypivalate, stearoyl peroxide, azobisisobutyronitrile, 1,1bis(t-butylperoxy)-1,3,5-trimethylcyclohexane, 1,1-bis(t-butylperoxyoctane), n-butyl-4,4-bis(t-butylperoxy)valerate, 2,2-bis(t-butylperoxy)butane, di-t-butyl diperoxyisophthalate, 2,5-dimethyldi(-benzoylperoxy)hexane, etc.

After completion of the polymerization reaction, the polymerization reaction product usually is transferred to a deaeration vessel where unused vinyl aromatic monomer is recovered by deaeration, and when a solvent is used in the polymerization reaction, the solvent is also recovered, to obtain a vinyl aromatic resin composition.

The vinyl aromatic resin composition obtained is considered to be a resin composition which contains a copolymer of the vinyl aromatic monomer with the unsaturated dicarboxylic anhydride such as a styrene-maleic anhydride copolymer (SMA) having dispersed therein the diene based rubber as a rubber component which absorbs the graft copolymer or the graft copolymer and the SMA. However, it is also possible that the vinyl aromatic resin composition contains a graft copolymer derived from the above described graft copolymer to which styrene or SMA is added, or contains a homopolymer of styrene. In any case, of the vinyl aromatic resin compositions obtained by the method of the present invention, those which contain the graft copolymer in an amount of from 10 to 35% by weight, preferably from 15 to 30% by weight, the diene based rubber, if present, in an amount of from 0.5 to 9% by weight, preferably from 1 to 7% by weight, and the SMA in which the content of styrene monomer is from 70 to 98 mol%, preferably from 72 to 95 mol%, and the content of maleic anhydride monomer is from 2 to 30 mol%, preferably from 5 to 28 mol%, in an amount of from 65 to 90% by weight, preferably from 70 to 85% by weight, are preferred in view of the fact that their glossiness, impact strength and heat resistance are improved satisfactorily.

As stated above, vinyl aromatic resin compositions having excellent glossiness, impact strength and heat resistance can be obtained by the method of the present invention.

In order to further improve the impact strength of the vinyl aromatic resin composition, it is preferred to blend the composition with an organic polysiloxane having a repeated structural unit represented by the general formula

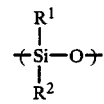

wherein $R^1$ and $R^2$, which may be the same or different, each represent an alkyl group, an aryl group or an aralkyl group.

The organic polysiloxane may be a homopolymer type organic polysiloxane in which there is involved a single kind of repeated structural unit only, or a random, block or graft copolymer type organic polysiloxane in which there are involved two or more kinds of repeated structural units. Further, in the present invention, those organic polysiloxanes in which a part of organic groups is substituted with a hydroxyl group, an alkoxy group, a hydroxyalkyl group or a polyhydroxyalkylene group. These organic polysiloxanes can be used singly or two or more organic polysiloxanes can be used in admixture.

Suitable examples of the organic polysiloxane include dimethyl polysiloxane, methyl phenyl polysiloxane, diphenyl polysiloxane, etc. Of these, dimethyl polysiloxane is preferred. The viscosity of the organic polysiloxane is not limited particularly, and usually it ranges from 10 to 100,000 cSt (30° C.), preferably from 30 to 2,000 cSt (30° C.). The organic polysiloxane having a viscosity of below 10 cSt (30° C.) has a high volatility and as a result molded articles molded therefrom show an undesirable surface appearance. On the other hand, the organic polysiloxane having a viscosity above 100,000 cSt (30° C.) is undesirable since it is difficult to uniformly mix it with the vinyl aromatic resin composition.

Usually, the amount of the organic polysiloxane blended is 1 part by weight or less, preferably from 0.02 to 0.2 part by weight, per 100 parts by weight of the vinyl aromatic resin composition. The organic polysiloxane can be added at the time of polymerization reaction or after the polymerization reaction is over.

In the method of the present invention, various additives such as an antioxidant, e.g., a hindered phenol based antioxidant, a phosphor based antioxidant, etc., a flame retardant, and the like can be added before or after polymerization reaction.

The vinyl aromatic resin composition produced by the method of the present invention have an excellent glossiness, impact strength and heat resistance and therefore it serves as a useful resin composition which can be molded by an extrusion molding method, an injection molding method, etc. and used not only for domestic electric appliances, interior and exterior automotive trims, and the like but also in various fields of industry including food products, medical treatments, daily necessaries and general merchandise, and the like.

In the present invention, polymerization reaction is carried out after blending a graft copolymer having a specific construction or such graft copolymer plus a diene based rubber, a vinyl aromatic monomer and an unsaturated dicarboxylic anhydride in specific ratios and in a specific sequence, and as a result of this, vinyl aromatic resin compositions having an excellent glossiness, impact strength and heat resistance can be produced. That is, according to the method of the present invention, vinyl aromatic resin compositions having an excellent glossiness, impact strength and heat resistance are provided.

Hereinbelow, the present invention will be described in greater detail with reference to the following examples and comparative examples. However, the present invention is not to be construed as being limited to these examples.

EXAMPLES 1 TO 3

As shown in the single FIGURE, a first polymerization reactor 1 of a volume of 1.8 l provided with double helical blades and a second polymerization reactor 2 of a volume of 2.3 l provided with double helical blades were arranged in series and connected with each other using a transfer conduit. Further, upstream of the first polymerization reactor 1 was arranged a rubber mixing vessel 3 and the both were connected with each other.

In the rubber mixing vessel 3 were charged 89.95% by weight of styrene, 10% by weight of an MBS resin powder ("METABLEN C-223", a trade name for a product by Mitsubishi Rayon Co., Ltd.), and 0.05% by weight of silicone oil, and the mixture was supplied to the first polymerization reactor 1 at a flow rate of 1 l/hr, while supplying maleic anhydride thereto at a flow rate shown in Table 1. During this, the reaction mixture was heated at a temperature of from 105° to 135° C., and the polymerization reaction was continued until the conversion of styrene in the first polymerization reactor 1 reached the value shown in Table 1.

Then, the reaction mixture in the first polymerization reactor 1 was transferred as it is to the second polymerization reactor 2 and at the same time maleic anhydride was supplied to the second polymerization reactor 2 at a flow rate shown in Table 1. The reaction system was heated at a temperature of from 105° to 135° C. and the polymerization reactor was continued until the conversion of styrene reached the value shown in Table 1.

After completion of the polymerization reaction, the reaction mixture derived from the second polymerization reactor 2 was passed to a deaeration vessel 4 and unused chemicals were removed via a line 5, and then the reaction mixture was extruded from an extruder 6 provided with a vent to obtain pellets.

The pellets thus obtained were injection molded to form test pieces. The melt index, glossiness, Izod impact strength and heat distortion temperature of each test piece were determined in the following manner.

Glossiness: According to JIS K 70175.
  Izod Impact Strength: According to JIS K 7110 (notched).
  Heat Distortion Temperature: According to JIS K 7207 (load: 18.5 Kg/cm$^2$; temperature elevation rate: 2° C./min.).

The results obtained are shown in Table 1.

EXAMPLES 4 TO 8

The same procedures as in Examples 1 to 3 were repeated except that silicone oil was added after the polymerization and deaeration instead of adding at the time of polymerization.

The results obtained are shown in Table 1.

EXAMPLES 9 AND 10

The same procedures as in Example 4 were repeated except that silicone oil was not used.

The results obtained are shown in Table 1.

COMPARATIVE EXAMPLES 1 to 3

The same procedures as in Example 1 were repeated except that a polybutadiene ("ASAPRENE 700 A", a trade name for a product by Asahi Chemical Industry Co., Ltd.; viscosity in styrene solution: 35 cp) was used in place of the MBS resin.

The results obtained are shown in Table 1.

COMPARATIVE EXAMPLES 4 AND 5

The same procedures as in Example 1 were repeated except that the amount of the MBS resin was changed as shown in Table 1.

The results obtained are shown in Table 1.

TABLE 1

| | First Polymerization Reactor | | Second Polymerization Reactor | | Resin Composition | | | | | | |
|---|---|---|---|---|---|---|---|---|---|---|---|
| Run | Maleic Anhydride (ml/hr) | Styrene Conversion (wt %) | Maleic Anhydride (ml/hr) | Styrene Conversion (wt %) | Maleic Anhydride in SMA (mol %) | Amount of MBS (wt %) | Amount of Silicone Oil (wt %) | Melt Index (g/10 min.) | Glossiness | Izod Impact Strength (Kg-cm/cm) | Heat Distortion Temperature (°C.) |
| Ex. 1 | 12.4 | 29.3 | 8.7 | 51.3 | 6.0 | 17.5 | 0.09 | 1.4 | 91 | 8.2 | 98.5 |
| Ex. 2 | 8.2 | 21.3 | 13.2 | 50.1 | 6.6 | 17.8 | 0.09 | 0.8 | 91 | 7.7 | 100.0 |
| Ex. 3 | 16.3 | 19.4 | 17.7 | 39.8 | 12.6 | 21.2 | 0.09 | 0.8 | 90 | 10.1 | 107.0 |
| Ex. 4 | 26.5 | 32.1 | 17.3 | 49.4 | 14.0 | 17.7 | 0.1 | 2.0 | 92 | 7.9 | 109.0 |
| Ex. 5 | 8.3 | 19.9 | 8.9 | 40.2 | 6.6 | 21.3 | 0.1 | 0.9 | 93 | 9.6 | 100.0 |
| Ex. 6 | 16.3 | 20.6 | 26.3 | 47.0 | 13.1 | 18.4 | 0.1 | 0.8 | 91 | 8.5 | 108.0 |
| Ex. 7 | 16.8 | 18.3 | 28.1 | 51.8 | 12.8 | 17.0 | 0.1 | 0.7 | 91 | 8.1 | 107.0 |
| Ex. 8 | 16.8 | 18.3 | 28.1 | 51.8 | 12.8 | 17.0 | 0.07 | 0.7 | 91 | 7.9 | 107.0 |
| Ex. 9 | 8.2 | 20.1 | 9.0 | 40.3 | 6.6 | 21.3 | — | 0.9 | 92 | 4.8 | 100.0 |
| Ex. 10 | 16.2 | 20.2 | 18.1 | 49.3 | 12.6 | 17.8 | — | 0.8 | 91 | 4.9 | 106.5 |
| C. Ex. 1 | 8.7 | 19.3 | 16.6 | 45.4 | 8.4 | BR 19.2 | 0.1 | 1.0 | 12 | 10.1 | 101.0 |
| C. Ex. 2 | 17.0 | 20.1 | 27.2 | 50.8 | 12.9 | BR 17.3 | 0.1 | 0.6 | 60 | 6.2 | 107.0 |
| C. Ex. 3 | 8.6 | 20.5 | 13.6 | 50.3 | 6.9 | BR 17.7 | — | 0.6 | 62 | 5.3 | 99.0 |
| C. Ex. 4 | 15.9 | 22.3 | 18.4 | 49.0 | 12.6 | 5.1 | 0.1 | 0.8 | 93 | 2.1 | 108.0 |
| C. Ex. 5 | 16.3 | 18.2 | 17.9 | 51.0 | 12.5 | 41.3 | 0.1 | 0.2 | 89 | 13.0 | 88.5 |

EXAMPLES 11 TO 14

In the same manner as in Example 1, the production line as shown in the single FIGURE was employed.

In the rubber mixing vessel 3 were charged from 87 to 89.5% by weight of styrene, 10% by weight of an MBS resin powder ("METABLEN C-223", a trade name for a product by Mitsubishi Rayon Co., Ltd.), from 3 to 0.5% by weight of a butadiene rubber ("NF-55AS", a trade name for a product by Asahi Chemical Industry Co., Ltd.; viscosity in styrene solution: 150 cp), and 0.05% by weight of silicone oil, and mixed.

The resulting mixture was treated in the same manner as in Example 1, and the polymerization reaction was continued until the conversion of styrene in the first polymerization reactor 1 reached the value as shown in Table 1.

Then, the reaction mixture was transferred as it is to the second polymerization reactor 2, and at the same time the same procedures as in Example 1 were repeated. The polymerization reaction was continued until the conversion of styrene in the second polymerization reactor 2 reached the value shown in Table 1.

After completion of the polymerization reaction, pellets are obtained in the same manner as in Example 1. The pellets were injection molded to form test pieces.

The melt index, glossiness, Izod impact strength and heat distortion temperature of each test piece were determined in the same manner as in Example 1.

The results obtained are shown in Table 2.

EXAMPLES 15 TO 19

The same procedures as in Examples 11 to 14 were repeated except that silicone oil was added after the polymerization and deaeration instead of adding at the time of polymerization.

The results obtained are shown in Table 2.

EXAMPLE 20

The same procedures as in Example 11 were repeated except that silicone oil was not used.

The results obtained are shown in Table 2.

COMPARATIVE EXAMPLES 6 AND 7

The same procedures as in Example 11 were repeated except that both the MBS resin and silicone oil were not used.

The results obtained are shown in Table 2.

COMPARATIVE EXAMPLES 8 TO 11

The same procedures as in Example 11 were repeated except that the composition of the MBS resin, butadiene rubber, styrene and maleic anhydride was changed as shown in Table 2. The results obtained are shown in Table 2.

TABLE 2

| Run | First Polymerization Reactor | | Second Polymerization Reactor | | Resin Composition | | | | Melt Index (g/10 min.) | Glossiness | Izod Impact Strength (Kg-cm/cm) | Heat Distortion Temperature (°C.) |
|---|---|---|---|---|---|---|---|---|---|---|---|---|
| | Maleic Anhydride (ml/hr) | Styrene Conversion (wt %) | Maleic Anhydride (ml/hr) | Styrene Conversion (wt %) | Maleic Anhydride SMA (mol %) | MBS (wt %) | Polybutadiene (wt %) | Silicone Oil (wt %) | | | | |
| Ex. 11 | 12.5 | 29.5 | 8.6 | 50.9 | 6.8 | 17.6 | 1.0 | 0.1 | 1.5 | 90 | 9.1 | 99.0 |
| Ex. 12 | 12.4 | 29.8 | 8.7 | 50.8 | 6.8 | 17.6 | 3.9 | 0.1 | 1.4 | 80 | 10.4 | 98.0 |
| Ex. 13 | 26.4 | 31.7 | 17.4 | 48.9 | 14.1 | 17.8 | 2.0 | 0.1 | 2.0 | 88 | 10.3 | 107.5 |
| Ex. 14 | 25.9 | 32.2 | 17.3 | 50.1 | 13.6 | 17.5 | 5.7 | 0.1 | 1.9 | 71 | 12.0 | 109.0 |
| Ex. 15 | 12.4 | 30.1 | 8.7 | 50.2 | 6.9 | 17.8 | 2.0 | 0.1 | 1.3 | 89 | 9.9 | 99.0 |
| Ex. 16 | 12.5 | 29.2 | 8.8 | 50.3 | 6.9 | 17.7 | 5.8 | 0.1 | 1.4 | 72 | 12.3 | 99.0 |
| Ex. 17 | 26.6 | 31.9 | 17.2 | 49.7 | 13.9 | 17.6 | 1.0 | 0.1 | 2.1 | 90 | 9.1 | 108.0 |
| Ex. 18 | 26.7 | 32.5 | 17.1 | 49.4 | 13.9 | 17.7 | 3.8 | 0.1 | 1.8 | 81 | 11.4 | 108.5 |
| Ex. 19 | 16.3 | 19.4 | 17.6 | 49.7 | 12.6 | 23.5 | 4.0 | 0.1 | 0.8 | 80 | 12.3 | 106.5 |
| Ex. 20 | 16.8 | 18.3 | 28.1 | 51.8 | 12.8 | 16.9 | 4.2 | — | 0.7 | 81 | 4.1 | 106.0 |
| C. Ex. 6 | 26.2 | 32.7 | 17.2 | 50.0 | 13.7 | — | 19.1 | — | 2.1 | 43 | 6.5 | 108.0 |
| C. Ex. 7 | 12.6 | 30.1 | 8.6 | 51.2 | 6.8 | — | 19.1 | — | 1.4 | 38 | 7.5 | 98.5 |
| C. Ex. 8 | 15.9 | 22.2 | 18.5 | 49.0 | 12.6 | 5.2 | 3.8 | 0.1 | 0.8 | 83 | 4.1 | 107.5 |
| C. Ex. 9 | 16.3 | 18.2 | 17.5 | 51.1 | 12.5 | 41.5 | 3.8 | 0.1 | 0.2 | 88 | 15.0 | 88.0 |
| C. Ex. 10 | 12.4 | 28.8 | 8.7 | 50.8 | 6.8 | 17.3 | 9.8 | 0.1 | 1.3 | 50 | 13.5 | 99.0 |
| C. Ex. 11 | 26.1 | 32.1 | 17.3 | 50.0 | 13.7 | 17.4 | 9.6 | 0.1 | 2.0 | 48 | 12.5 | 108.0 |

Although the present invention has been described with preferred embodiments, it is to be understood that variations and modifications may be employed as will be apparent to those skilled in the art. Such variations and modifications are to be considered within the purview and the scope of the claims appended hereto.

What is claimed is:

1. A method for producing a vinyl aromatic resin composition containing a rubber in a dispersed state which comprises 60-90% by weight of a copolymer of a vinyl aromatic monomer with an unsaturated dicarboxylic anhydride in which the content of the vinyl aromatic monomer unit is 70-98 mol% and the content of the unsaturated dicarboxylic anhydride unit is 2-30 mol%, 10-35% by weight of a graft copolymer and 0-9% by weight of a diene based rubber, by copolymerizing a vinyl aromatic monomer with an unsaturated dicarboxylic anhydride in the presence of a rubber by a multi-stage continuous process which comprises mixing 2-25% by weight of a graft copolymer, as said rubber, which comprises (a) 50-85% by weight of a polymer main chain containing a butadiene unit in an amount of 50% by weight or more, (b) 40-5% by weight of a polymethacrylate side chain attached by graft-polymerization to the polymer main chain (a) and (c) 0-40% by weight of a polystyrene side chain attached by graft-polymerization to the polymer main chain (a) or 2-25% by weight in total of this graft copolymer and a diene based rubber with 95-75% by weight of a vinyl aromatic monomer, then adding an unsaturated dicarboxylic anhydride to the resulting mixture and continuing polymerization reaction until the conversion of the vinyl aromatic monomer reaches a value within the range of 30-80% by weight.

2. A method for producing a vinyl aromatic resin composition according to claim 1 wherein said multi-stage continuous process uses a rubber mixing vessel, a first polymerization reactor and a second polymerization reactor which are connected with each other in series and wherein said process comprises mixing, in said rubber mixing vessel, said vinyl aromatic monomer, said graft copolymer and organic polysiloxane consisting essentially of a plurality of the same or different units, each unit being represented by the following general formula:

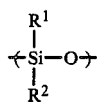

wherein $R^1$ and $R^2$ each represent an alkyl group, which may be the same or different, said polysiloxane having a viscosity of 10–100,000 cSt (30° C.), or mixing said vinyl aromatic monomer, said graft copolymer, said organic polysiloxane and said diene based rubber, continuously transferring the resulting mixture from said rubber mixing vessel to the first polymerization reaction, copolymerizing in said first polymerization reactor the vinyl aromatic monomer with the unsaturated dicarboxylic anhydride in the presence of said mixture until the conversion of the vinyl aromatic monomer reaches a value within the range of 15–40% by weight, transferring the contents of the first polymerization reactor to the second polymerization reactor while continuously introducing the starting materials into the first polymerization reactor and copolymerizing the vinyl aromatic monomer with the unsaturated dicarboxylic anhydride in the second polymerization reactor until the conversion of the vinyl aromatic monomer reaches a value within the range of 40–80% by weight.

3. A method for producing a vinyl aromatic resin composition as claimed in claim 2, wherein said organic polysiloxane is dimethyl polysiloxane.

4. A method for producing a vinyl aromatic resin composition as claimed in claim 1, wherein said polymethacrylate side chain is composed of methyl methacrylate or ethyl methacrylate.

5. A method for producing a vinyl aromatic resin composition as claimed in claim 1, wherein said diene based rubber is a polybutadiene.

6. A method for producing a vinyl aromatic resin composition as claimed in claim 1, wherein said vinyl aromatic monomer is styrene.

7. A method for producing a vinyl aromatic resin composition as claimed in claim 1, wherein said unsaturated dicarboxylic anhydride is maleic anhydride.

* * * * *